United States Patent
Klein

(10) Patent No.: US 9,252,671 B2
(45) Date of Patent: Feb. 2, 2016

(54) POWER SUPPLY WITH VOLTAGE OUTPUT RESPONSIVE TO LOAD DEMAND

(71) Applicant: Western Digital Technologies, Inc., Irvine, CA (US)

(72) Inventor: Barry L. Klein, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 122 days.

(21) Appl. No.: 13/923,290

(22) Filed: Jun. 20, 2013

(65) Prior Publication Data
US 2014/0321167 A1    Oct. 30, 2014

Related U.S. Application Data

(60) Provisional application No. 61/815,594, filed on Apr. 24, 2013.

(51) Int. Cl.
*H02M 3/335* (2006.01)
*H02M 1/00* (2007.01)

(52) U.S. Cl.
CPC .. *H02M 3/33507* (2013.01); *H02M 2001/0032* (2013.01); *Y02B 70/16* (2013.01)

(58) Field of Classification Search
CPC ............... H02M 3/33569; H02M 3/33507; H02M 3/135; H02M 7/48; H02M 7/537
USPC ............ 363/16, 20, 21.01, 95, 97, 124, 131
See application file for complete search history.

(56) References Cited

U.S. PATENT DOCUMENTS

| | | | |
|---|---|---|---|
| 3,913,002 A * | 10/1975 | Steigerwald et al. | 363/18 |
| 4,183,082 A * | 1/1980 | Ishii | 363/89 |
| 4,907,183 A | 3/1990 | Tanaka | |
| 4,964,029 A * | 10/1990 | Severinsky et al. | 363/80 |

(Continued)

FOREIGN PATENT DOCUMENTS

| | | |
|---|---|---|
| JP | 2000-166233 | 11/1998 |
| JP | 2000-036420 | 2/2000 |

(Continued)

OTHER PUBLICATIONS

MC33364 "Critical Conduction GreenLineTM SMPS Controller", Semiconductor Components Industries, LLC, Nov. 2010-Rev. 18, pp. 16.

(Continued)

*Primary Examiner* — Adolf Berhane

(57) ABSTRACT

A method for a power adapter to selectively provide a first and a second output voltage may comprise coupling a rectified and filtered transformer input signal to a primary winding of a transformer. The secondary winding thereof may comprise a first tap associated with the first output voltage and a second tap associated with the second output voltage, the first and second taps being configured to be selectively coupled to and uncoupled from an output of the power adapter. The output current drawn at the output of the power adapter may then be sensed. When the sensed output current is determined to have exceeded a predetermined threshold, the output of the power adapter may be switched from the first to the second tap by uncoupling the first tap from the output of the power adapter and coupling the second tap to the output of the power adapter.

20 Claims, 2 Drawing Sheets

(56) References Cited

U.S. PATENT DOCUMENTS

| | | | |
|---|---|---|---|
| 5,353,215 A * | 10/1994 | Dinwiddie et al. | 363/65 |
| 5,479,087 A * | 12/1995 | Wright | 323/267 |
| 5,499,178 A * | 3/1996 | Mohan | 363/39 |
| 5,631,814 A * | 5/1997 | Zak | 363/37 |
| 5,815,388 A * | 9/1998 | Manley et al. | 363/63 |
| 5,889,391 A * | 3/1999 | Coleman | 323/271 |
| 5,910,886 A * | 6/1999 | Coleman | 363/17 |
| 6,455,953 B1 | 9/2002 | Lam | |
| 7,701,705 B1 | 4/2010 | Szeremeta | |
| 8,064,194 B2 | 11/2011 | Szeremeta | |
| 8,102,678 B2 * | 1/2012 | Jungreis | 363/21.03 |
| 8,113,873 B1 | 2/2012 | Sarraf | |
| 8,133,426 B1 | 3/2012 | Yurchenco et al. | |
| 8,314,632 B1 | 11/2012 | Liu | |
| 8,358,395 B1 | 1/2013 | Szeremeta | |
| 8,417,979 B2 | 4/2013 | Maroney | |
| 8,462,460 B1 | 6/2013 | Szeremeta et al. | |
| 8,498,088 B1 | 7/2013 | Klein | |
| 8,547,658 B1 | 10/2013 | Szeremeta | |
| 8,605,464 B2 * | 12/2013 | Sase et al. | 363/21.02 |
| 2006/0039171 A1 | 2/2006 | Lavieville et al. | |

FOREIGN PATENT DOCUMENTS

| | | |
|---|---|---|
| JP | 2000-234457 | 8/2000 |
| JP | 2010-051116 | 3/2010 |

OTHER PUBLICATIONS

"Implementing Directive 2005/32/EC of the European Parliament and of the Council with regard to ecodesign requirements for no-load condition electric power consumption and average active efficiency of external power supplies" Commission Regulation (EC) No. 278/2009, Official Journal of the European Union, Apr. 6, 2009, pp. 8.

"Guidelines accompanying Commission Regulation (EC) No. 1275/2008 of Dec. 17, 2008 implementing Directive 2005/32/EC of the European Parliament and of the Council with regard to ecodesign requirements for standby and off-mode electric power consumption of electrical and electronic household equipment", http://ec.europa.eu/energy/efficiency/ecodesign/doc/legislation/guidelines_for_smes_1275_2008_okt_09.pdf, Oct. 2009 pp. 22.

International Search Report and Written Opinion dated Aug. 26, 2014 from related PCT Serial No. PCT/US2014/035356, 10 pages.

* cited by examiner

POWER SUPPLY WITH VOLTAGE OUTPUT RESPONSIVE TO LOAD DEMAND

CROSS REFERENCE TO RELATED APPLICATIONS

The present application claims priority to commonly assigned U.S. provisional patent application Ser. No. 61/815,594 filed on Apr. 24, 2013, which application is hereby incorporated herein in its entirety.

BACKGROUND

Embodiments relate to the field of power adapters such as, for example, power adapters that are used in conjunction with electronic devices such as data storage devices and computing devices.

DETAILED DESCRIPTION

One embodiment is a power converter with an output voltage that responds to a load demand of an electronic device coupled thereto, thereby enabling greater power efficiency at both a standby and at an operating power level by tailoring the output voltage to the operating mode of the electronic device or other power-drawing device.

Figure 1:
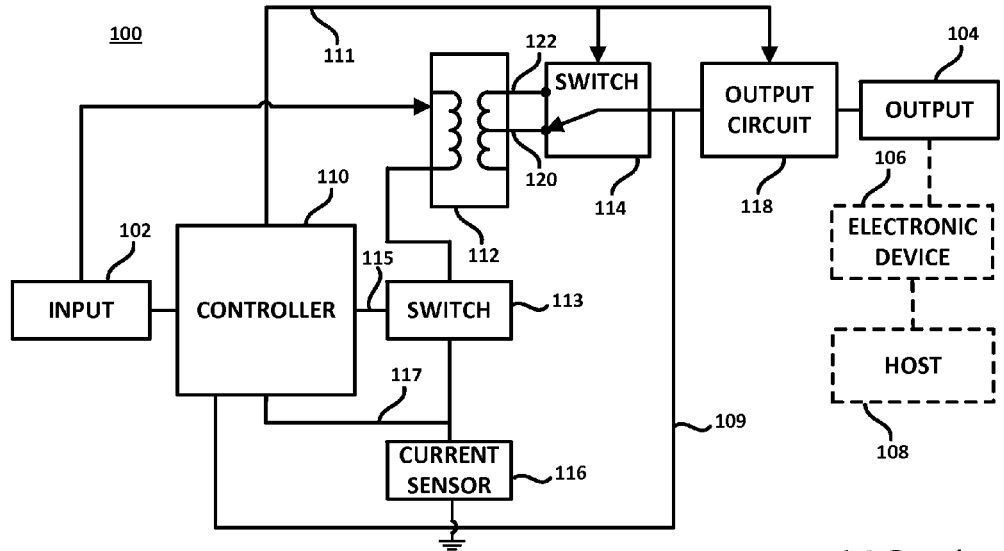
FIG. 1 is a block diagram of a power adapter according to one embodiment.

FIG. 1 is a block diagram of a power adapter according to one embodiment. As shown, the power adapter 100 may comprise, according to one embodiment, a transformer input signal 102 coupled to a transformer 112. According to one embodiment, the transformer input signal 102 may be a direct current (DC) signal generated from a rectified and filtered alternating current (AC) source (such as, for example, a 110V source from a common wall socket). Alternatively and according to one embodiment, the input 102 may be a DC input signal from, for example, a car battery and the transformer 112, together with the output circuit 118 discussed hereunder, may be configured to selectively convert the 12V input signal to appropriate levels. The transformer 112 may comprise a primary winding, switched at a duty cycle by switch 113, and coupled to the transformer input signal 102 and a secondary winding coupled to an output 104 of the power adapter 100, either directly or through other elements such as the output circuit 118 in FIG. 1. A current sensor 116 may be configured to sense the transformer primary current which corresponds to the current of the output 104 of the power adapter 100 and to generate a current sense signal, shown at 117 in FIG. 1. According to one embodiment, the electronic device 106 may comprise a data storage device that may be coupled to a host, as shown at reference numeral 108.

The power adapter 100 may also, according to one embodiment, comprise a controller 110. The controller 110 may be configured to a) regulate the voltage at the output of the power adapter 100 by controlling current flowing through the primary winding of the transformer 112 and b) to select an output voltage from at least a first voltage and a second voltage, based upon the current sense signal 117.

As also shown in FIG. 1, the power adapter 100 may also comprise a switch 114 coupled to the controller via first control signal 111 and to the secondary winding of the transformer 112. The switch 114, according to one embodiment, may be configured to control which of the first and second voltages (or other additional available voltages, if any) is presented at the output 104 of the power adapter 100 based upon the output voltage selected by the controller 110. According to one embodiment, the controller 110 may be configured to select which of the first and second voltages (or other additional available voltages) is presented at the output 104 of the power adapter 100 through changing the state of the first control signal 111.

According to one embodiment, the secondary winding of the transformer 112 may comprise at least a first tap 120 and a second tap 122, and additional taps if a greater number of voltages are to be presented at the output 104 of the power adapter 100. Indeed, the controller 110 may be further configured to generate the first control signal 111 based upon the current sense signal 117 to the current sensor 116, which may be controlled by an isolated second control signal 109 that is fed back to controller 110. The primary winding of the transformer 112 may be switched by switch 113 at a duty cycle that is determined by the signal 115 of controller 110. According to one embodiment, the switch 114 may be configured to selectively couple the output 104 of the power adapter 100 to the first tap 120 or to the second tap 122 based upon the first control signal 111.

According to one embodiment, the controller 110 may be further configured to change the state of the first control signal 111 when the output current sensed by the current sensor 116 exceeds a predetermined threshold. For example, when the current sensed by the current sensor 116 exceeds a predetermined threshold, the controller 110 may be configured to change the state of the first control signal 111 from a first state associated with a first voltage provided at the output 104 to a second state associated with a second voltage provided at the output 104. According to one embodiment, such change of state of the first control signal 111 may cause the switch 114 to decouple the output 104 from the first tap 120 and to couple the output 104 to the second tap 122. For example, the first tap 120 may be a center tap of the secondary winding of the transformer 112 and the second tap 122 may be an outer tap of the secondary winding of the transformer 112.

As alluded to above, the secondary winding of the transformer 112 may be indirectly coupled to the output 104. For example, an output circuit 118 may be coupled between the switch 114 and the output 104 of the power adapter 100. According to one embodiment, the output circuit may comprise a voltage divider circuit, the ratio of the resistances of which may determine the output voltage seen at the output 104. According to one embodiment, the output circuit 118 may also be coupled to the first control signal 111. Controlled by the first control signal 111, the output circuit 118 may be configured to selectively change the ratio of resistances of the voltage divider and thus the voltage seen at the output 104, depending upon whether the controller selects the first or second voltages to be provided at the output 104. To selectively change the ratio of the resistances of the voltage divider, the output circuit may comprise a second switch 228 controlled by the first control signal 111. For example, based upon the state of the first control signal 111, the output circuit 118 may be configured to selectively switch additional resistances in or out of the voltage divider circuit of output circuit 118. According to one embodiment, the switch 114 may comprise one or more Field Effect Transistors (FETs) whose gate terminal is coupled to the first control signal 111 generated by controller 110.

According to one embodiment, the controller 110 may be configured to change the state of the first control signal 111 (and thus transition the output 104 of the power adapter 100 from the first voltage associated with the first (e.g., center) tap 120 of transformer 112 to the second voltage associated with the second (e.g. outer) tap 122 of the transformer 112) when an averaged output current sensed by the output current sensor 116 exceeds the predetermined threshold for a predetermined period of time. For example, a timer may be used to count up to a predetermined count or count down from the predetermined count, to determine when the predetermined period of time has elapsed.

That is, if the electronic device 106 draws an increased average amount of current as determined from the output current sensor 116 for a predetermined period of time, it may be assumed that the electronic device has changed operating modes and that the power adapter should reconfigure itself from providing the first voltage at the output 104 to providing the second voltage at the output 104. For example, the first voltage associated with the switch 114 coupled to the first (e.g., center) tap 120 of transformer 112 may be associated with a standby state of the electronic device 106 and the second voltage associated with the switch 114 coupled to the second (e.g., outer) tap 122 of transformer 112 may be associated with an active or operating state of the electronic device 106.

In the exemplary case in which the electronic device is or comprises a data storage device such as a hard disk drive, the standby state may be that state in which the data storage device is not currently servicing data access commands and has not done so for a period of time. In this example, in such a standby state, the hard disk drive may have spun down its platters and may only require 5 VDC, corresponding to the aforementioned first voltage. Upon leaving the standby state, such as would be required had the host 108 issued one or more data access commands requiring the disk drive to spin up its platters and to perform seek operations, the disk drive may draw a higher average current over a predetermined period of time, signaling to the controller 110 the need to change the state of the first control signal 111. According to one embodiment, this causes the output 104 to be switched from the standby voltage to a higher operating voltage by decoupling the output 104 from the first (e.g., center) tap 120 and coupling the output 104 to the second (e.g., outer) tap 122 of the transformer 112. Such a change of state of the first control signal 111 also causes the second switch within output circuit 118 to change the ratio of the voltage divider therein, to thereby provide the higher second voltage such as, for example, a 12 VDC operating voltage. It is to be noted that the 5 and 12 volt magnitudes for the first and second voltages are only exemplary and that the power adapter 100 may be suitably configured to provide more than two voltages and/or voltage levels that are different than the 5V and 12V discussed herein.

Figure 2:
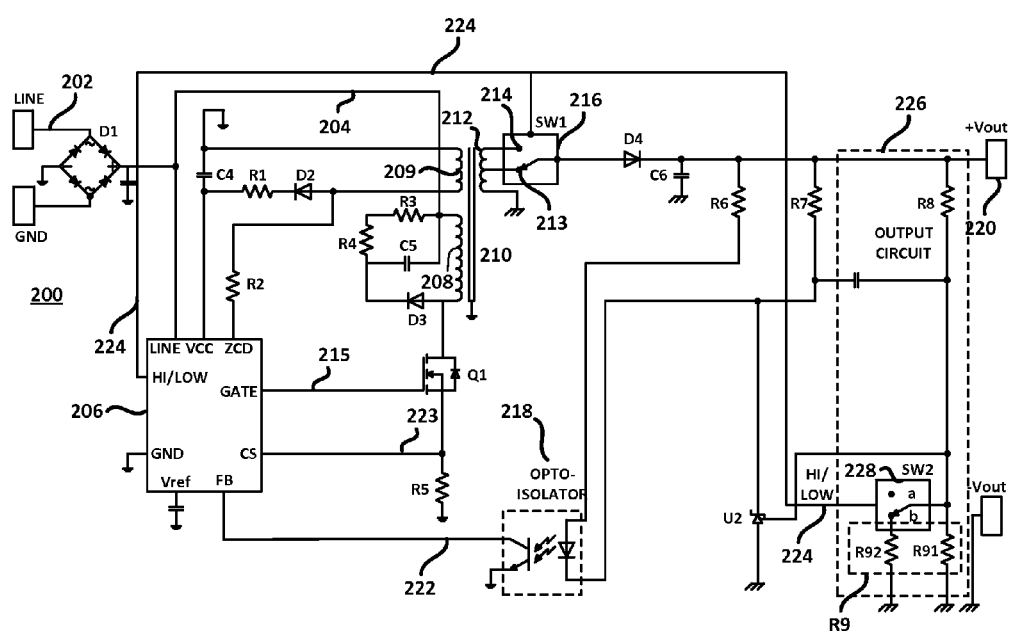
FIG. 2 is a circuit diagram of a power adapter according to one embodiment.

FIG. 2 is a circuit diagram of one implementation of a power adapter 200, according to one embodiment. As shown therein, a line voltage input 202 may be coupled, via a standard plug, for example, to a full wave rectifier circuit D1, the output of which may be DC low-pass filtered by a capacitor. The rectified and filtered input signal 204 may then be coupled to a Line terminal of a controller 206. According to one implementation, the controller 206 may be similar to Critical Conduction Greenline SMPS Controller, model MC33364 from ON Semiconductor, Inc., but with one additional signal pin (Hi/Low pin that generates first control signal 224). Other controllers may be used. The rectified and filtered input signal 204 may also be coupled to the primary winding 208 of transformer 210. Resistors R3, R4, capacitor C5 and diode D3 are configured as a clamping circuit to protect transistor Q1 from spikes on the primary winding 208 of transformer 210. The resistor R1 and the capacitor C4 provide Vcc supply voltage to the controller 206 from the auxiliary winding 209 of the transformer 210, rectified by diode D2. The primary winding 208 of the transformer 210 may be switched by FET Q1 at a pulse width that is determined by the gate signal 215 at the Gate output of the controller 206. The current sensor R5 limits the maximum drain current of Q1, the voltage at the gate of which, and thus the transformer duty cycle, may be set by isolated second control signal 222 that is fed back to controller 206. A Zero Current Detect (ZDC) terminal of controller 206 may be coupled to the auxiliary winding 209 of transformer 210 through resistance R2, to detect zero current from that auxiliary winding, to reduce switching losses.

According to one embodiment, current sensor R5 may be coupled between the transformer primary 208 and ground. The current sensor R5 may be configured to sense an output transformer primary current that corresponds to the current drawn at the output 220 of the power adapter 200. As shown, one implementation of the current sensor may comprise a current sensing resistor R5 coupled to the transformer primary path to ground. The collector of opto-isolator 218 sets the second control signal 222 that is fed back to the controller 206 for output voltage control. The current sensor R5 limits the output current in combination with the controller 206 and the gate signal 215. Opto-isolator 218 provides isolated feedback from output circuit 226 to controller 206.

The controller 206 may be configured to, responsive to the current sense signal 223, generate a first control signal 224. According to one embodiment, the controller 206 may be configured to change a state of the first control signal 224 when the output current sensed by the current sensor exceeds a predetermined threshold such as may occur when a load of the power adapter (such as electronic device 106 in FIG. 1) changes. According to one embodiment, the power adapter may comprise a first switch 216 coupled to the controller 206 and to the secondary winding 212 of the transformer 210. According to one embodiment, the first switch 216 may be configured to control which of the (at least) first and second voltages is presented at the output 220 of the power adapter 200 based upon the output voltage selected by the controller 206; that is, based upon the state of the first control signal 224 generated by the controller 206.

As shown in FIG. 2, the secondary winding 212 of the transformer 210 may comprise a first tap 213 and a second tap 214. The first switch 216 may controlled by the first control signal 224 to couple the output 220 of the power adapter 200 to either the first tap 213 of the transformer 210 or to the second tap 214 of the transformer 210. According to one embodiment, the controller 206 may be configured to generate the first control signal 224 based upon the current sense signal 223. According to one implementation, when the load (e.g., electronic device 106) does not draw an amount of current greater than a predetermined threshold, the first control signal 224, based upon the current sense signal 223, may cause the first switch 216 to couple the output 220 to the first (e.g., center) tap 213 (i.e., either switch back to or remain coupled to the first tap 213). Such a configuration may be appropriate when the electronic device is in a standby mode, for example. Conversely, when the load (e.g., electronic device 106) does indeed draw an amount of current that is greater than the predetermined threshold, the first control signal 224, based upon the current sense signal 223, may cause the first switch 216 to couple the output 220 to the second (e.g., outer) tap 214 (i.e., either switch back to or remain coupled to the second tap 214). Such a configuration may be appropriate when the electronic device is in or has switched to an operational mode, for example. It is to be understood that the adapter 100, 200 may also be appropriate to selectively drive a first electronic device operating at a first voltage or a second electronic device that operates at a second voltage, rather than a single electronic device that operates at both a first and a second voltage, depending upon its current mode of operation.

To develop the aforementioned first and second voltages, an output circuit 226 may be coupled between the first switch 216 and the output 220. According to one embodiment, the output circuit 226 may comprise a voltage divider configured to set the voltage that appears at 220. As shown, the output circuit 226 may comprise resistances R8 and R9, which resistance R9 may comprise R91 or R91 and parallel resistor R92. To enable the voltage divider to selectively provide the first and second voltages at the output 220, the output circuit 226 may be configured to selectively switch a resistance R91 into and out of the voltage divider formed by R8 and R91. According to one embodiment, when the first control signal 224 is in a first state indicative of the electronic device drawing a first amount of current that is less than the predetermined threshold, the second switch 228 is controlled to position (b) in which resistor R92 is in parallel with R91, which is the configuration illustrated in FIG. 2. In this configuration the voltage divider of the output circuit 226 comprises resistances R8 and R9, with R9 comprising R91 in parallel with R92. Conversely, when the first control signal 224 is in a second state indicative of the electronic device drawing a second amount of current that is greater than the predetermined threshold, the second switch 228 is controlled to position (a) in which resistor R92 taken out of the circuit. In this configuration the voltage divider of the output circuit 226 comprises resistances R8 and R9, with R9 comprising only R91, which results in a higher voltage at 220, as compared to the voltage at 220 when resistance R92 is switched back into the output circuit 226.

Avalanche diode U2 may be configured to drive the primary side of the isolator 218, to provide the output voltage feedback to the controller 206 by means of isolated second control signal 222 that is fed back to the controller 206. The conduction threshold of U2 may be set at will by setting the values of resistances R8 and R9. As such, avalanche diode U2 may be configured as a programmable voltage reference. Therefore, the conduction threshold will change as R92 is switched into and out of the circuit. When the average current at 220 is equal to or exceeds a predetermined threshold for, according to one embodiment, a predetermined period of time (to avoid triggering the circuit due to transients at the secondary winding of transformer 210), U2 conducts and pulls the cathode of the isolator 218's PN junction lower than its anode by an amount at least equal to its threshold voltage, causing the isolator 218 to conduct. The avalanche diode U2 may be, for example, a TL431 Adjustable Precision Shunt Regulator, available from Texas Instruments, Inc. Other diodes may be used for this purpose.

According to one embodiment, the power adapter may be configured to default to the first, lower voltage at the output 220, switch to the second, higher voltage if the averaged sensed output current exceeds standby current threshold for a predetermined period of time and switch back to the first, lower standby voltage when the sensed average output current drops below the predetermined voltage for the predetermined period of time.

According to one embodiment, therefore, the output 220 may be coupled to the first tap 213 of the transformer 210 when the electronic device 106 is operating in standby (e.g., lower power) mode and the output 220 may be coupled to the second tap 214 of transformer 210 when the electronic device 106 is operating in an operational (e.g., higher power) mode. Advantageously, efficiency is improved in the standby mode. Moreover, the power adapter 200 is configured such that it exhibits functionality previously only available using multiple power supplies.

According to one embodiment, switch 114 in FIGS. 1 and 216 in FIG. 2 may be eliminated by configuring a single transformer winding to provide the necessary current with less concern over transformer efficiency over the load profile. The controller 110 in FIGS. 1 and 206 in FIG. 2 may then be configured to adjust the frequency and/or pulse width through Q1 to achieve the voltages desired for, e.g., Standby and Full Power conditions.

According to a further embodiment, two isolated feedback signals may be used, (comprising, e.g., two opto-isolators two programmable voltage reference circuits) may be used, resulting in two feedback paths that the controller 206. The controller 206 may then be configured to switch between the two feedback (second control) signals on the primary side of the transformer 210.

Figure 3:
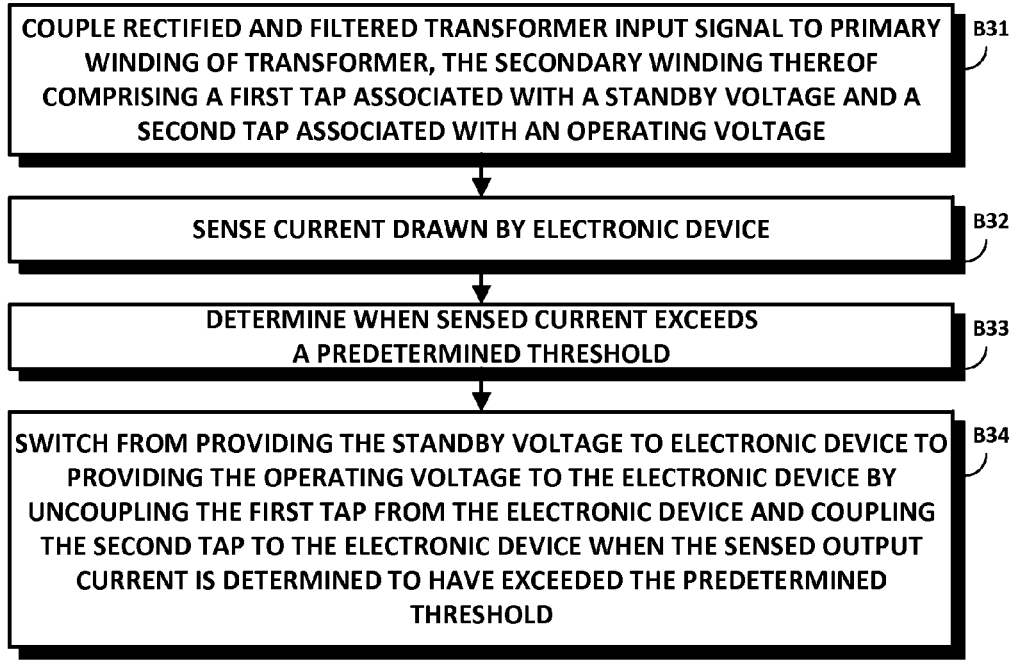
FIG. 3 is a flowchart of a method of selectively providing a standby voltage or an operating voltage to an electronic device, according to one embodiment.

FIG. 3 is a flowchart of a method of selectively providing a standby voltage or an operating voltage to an electronic device, according to one embodiment. As shown therein, Block B31 calls for coupling a (e.g., rectified and filtered) transformer input signal to the primary winding of a transformer, the secondary winding of which comprises a first tap associated with a standby voltage and a second tap associated with an operating voltage. Block B32 calls for sensing the current drawn by a load, such as an electronic device coupled to the power adapter. As shown at B33, it may then be determined whether the sensed averaged current exceeds a predetermined threshold. According to one embodiment, such determination may be made after a predetermined period of time, to ensure that the sensed current is indeed associated with a change of operational mode in the electronic device coupled to the power adapter. Lastly, as shown at B34, the power adapter may switch from providing the standby voltage to the electronic device to providing the operating voltage to the electronic device by uncoupling the first tap from the electronic device and coupling the second tap to the electronic device when the sensed output current is determined to have exceeded the predetermined threshold.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A power adapter, comprising:
   a rectifier and filter configured to be coupled to an input alternating current (AC) source and to generate a direct current (DC) transformer input signal;
   a transformer, the transformer comprising a primary winding coupled to the transformer input signal and a secondary winding coupled to an output of the power adapter;
   a current sensor configured to enable determination of an output current drawn at the output of the power adapter and to generate a current sense signal; and
   a controller configured to a) regulate a voltage at the output of the power adapter by controlling current flowing through the primary winding of the transformer and b) select an output voltage from at least a first voltage and a second voltage based upon the current sense signal.

2. The power adapter of claim 1, further comprising a first switch coupled to the controller and to the secondary winding of the transformer, the first switch being configured to control which of the at least first and second voltages is presented at the output of the power adapter based upon the output voltage selected by the controller.

3. The power adapter of claim 2, wherein the secondary winding of the transformer comprises a first tap and a second tap, wherein the controller is further configured to generate a first control signal based upon the current sense signal and wherein the first switch selectively couples the output of the power adapter to the first or second tap based upon the first control signal.

4. The power adapter of claim 3, wherein the controller is further configured to change a state of the first control signal when the output current sensed by the current sensor exceeds a predetermined threshold.

5. The power adapter of claim 1, further comprising an isolated second control signal that is fed back from the output of the power adapter to the controller.

6. The power adapter of claim 2, further comprising an output circuit coupled between the first switch and the output of the power adapter, wherein the output circuit comprises a voltage divider circuit.

7. The power adapter of claim 6, wherein the output circuit further comprises a second switch that is configured to selectively change a ratio of the voltage divider circuit.

8. The power adapter of claim 7, wherein at least one of the first and second switches comprises a field effect transistor (FET).

9. The power adapter of claim 3, wherein the controller is further configured to change a state of the first control signal when an averaged output current sensed by the current sensor exceeds the predetermined threshold for a predetermined period of time.

10. A method for a power adapter to selectively provide a first and a second output voltage, comprising:
    coupling a direct current (DC) input signal to a primary winding of a transformer, a secondary winding thereof comprising a first tap associated with the first output voltage and a second tap associated with the second output voltage, each of the first and second taps being configured to be selectively coupled to and uncoupled from an output of the power adapter;
    determining an output current drawn at the output of the power adapter;
    determining when the sensed output current exceeds a predetermined threshold; and
    switching the output of the power adapter from the first to the second tap of the transformer by uncoupling the first tap from the output of the power adapter and coupling the second tap to the output of the power adapter when the sensed output current is determined to have exceeded the predetermined threshold.

11. The method of claim 10, further comprising changing a ratio of a voltage divider coupled to the output of the power adapter when the sensed output current is determined to have exceeded the predetermined threshold.

12. The method of claim 11, wherein changing the ratio of the voltage divider comprises controlling a field effect transistor (FET) into and out of conduction.

13. The method of claim 10, further comprising starting a timer when the sensed averaged output current is determined to have exceeded a predetermined threshold and wherein switching comprises switching the output of the power adapter from the first to the second tap when the timer reaches a predetermined value.

14. The method of claim 10, wherein switching further comprises switching a terminal of a field effect transistor (FET) from the first tap to the second tap.

15. A method of selectively providing a standby voltage or an operating voltage to an electronic device, comprising:
    coupling a rectified and filtered direct current (DC) transformer input signal to a primary winding of a transformer, a secondary winding thereof comprising a first tap associated with the standby voltage and a second tap associated with the operating voltage, each of the first and second taps being configured to be selectively coupled to and uncoupled from the electronic device;
    determining a current drawn by the electronic device;
    determining when the sensed current exceeds a predetermined threshold that is indicative of the electronic device switching from a standby state to an operating state; and
    switching from providing the standby voltage to providing the operating voltage by uncoupling the first tap from the electronic device and coupling the second tap to the electronic device when the sensed output current is determined to have exceeded the predetermined threshold.

16. The method of claim 15, further comprising coupling a voltage divider to the electronic device and changing a ratio of the voltage divider when the sensed current is determined to have exceeded the predetermined threshold.

17. The method of claim 16, wherein changing the ratio of the voltage divider comprises controlling a field effect transistor (FET) into and out of conduction.

18. The method of claim 15, wherein switching comprises uncoupling the first tap from the electronic device and coupling the second tap to the electronic device when an averaged sensed current is determined to have exceeded a predetermined threshold for a predetermined period of time.

19. The method of claim 15, wherein switching further comprises switching a terminal of a field effect transistor from being coupled to the first tap to being coupled to the second tap.

20. The method of claim 15, wherein the electronic device comprises a data storage device.

\* \* \* \* \*